United States Patent [19]

Daneshvar et al.

[11] Patent Number: 5,398,668

[45] Date of Patent: Mar. 21, 1995

[54] DEEP FRYING APPARATUS

[75] Inventors: Manouchehr Daneshvar, Novi; William E. Kraemer, Sterling Heights, both of Mich.

[73] Assignee: Combustion Concepts, Inc., Detroit, Mich.

[21] Appl. No.: 274,993

[22] Filed: Jul. 13, 1994

[51] Int. Cl.[6] ............................................. A47J 27/00
[52] U.S. Cl. ..................................... 126/391; 99/330; 99/403; 126/374; 126/376
[58] Field of Search ................. 99/403, 407, 408, 330; 126/373, 374, 376, 391, 390, 351, 360 R, 343.5 A; 431/1

[56] References Cited

U.S. PATENT DOCUMENTS

| | | |
|---|---|---|
| 2,176,869 | 10/1939 | Childs . |
| 3,809,062 | 5/1974 | Moore et al. . |
| 3,938,948 | 2/1976 | Moore et al. . |
| 3,948,593 | 4/1976 | Moore et al. . |
| 4,091,801 | 5/1978 | Lazaridia et al. . |
| 4,206,742 | 6/1980 | Johnson . |
| 4,228,730 | 10/1980 | Schindler . |
| 4,397,299 | 8/1983 | Taylor et al. . |
| 4,505,193 | 3/1985 | Marietti . |
| 4,550,711 | 11/1985 | Griffiths . |
| 4,602,612 | 7/1986 | Schwizer ............................... 99/403 |
| 4,690,127 | 9/1987 | Seak . |
| 4,751,915 | 6/1988 | Price . |
| 4,838,244 | 6/1989 | Giles, Sr. et al. ............... 126/391 |
| 4,848,317 | 7/1989 | Prudhomme et al. . |
| 4,848,318 | 7/1989 | Brewer . |
| 4,858,592 | 8/1989 | Hayek et al. . |
| 4,898,151 | 2/1990 | Luebbe et al. . |
| 4,913,041 | 4/1990 | Taber et al. . |
| 5,050,582 | 9/1991 | Almond et al. ................... 126/391 |

Primary Examiner—Timothy F. Simone
Attorney, Agent, or Firm—Harness, Dickey & Pierce

[57] ABSTRACT

A high efficient gas fired frying apparatus for deep frying food is disclosed. The gas fired frying apparatus is comprised of a supply system for air and fuel gas, a compression system, a burner system, a combustion chamber, a heat exchanger and an exhaust system. The air and fuel gas are mixed and pressurized prior to being introduced to the burner system. The burner system works in conjunction with the combustion chamber to support combustion by balancing the premixture velocity with the flame velocity such that smooth and complete combustion occurs. The high velocity components of combustion are directed through a heat exchanger which transfers the heat to the cooking oil. The exhaust system recovers additional energy from the products of combustion and a catalytic converter may be added for removal of unwanted pollutants. Both the combustion chamber and the heat exchanger are removably disposed within the frypot to facilitate cleaning and oil replacement.

58 Claims, 6 Drawing Sheets

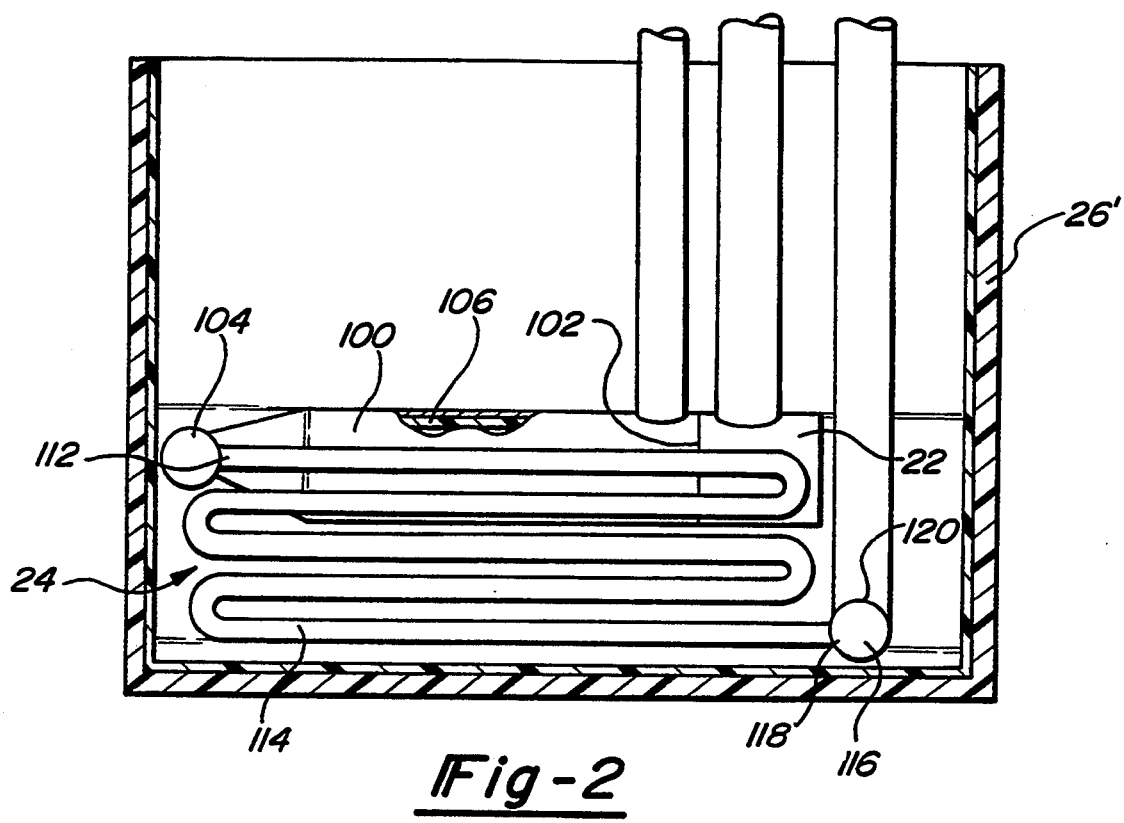
Fig-2
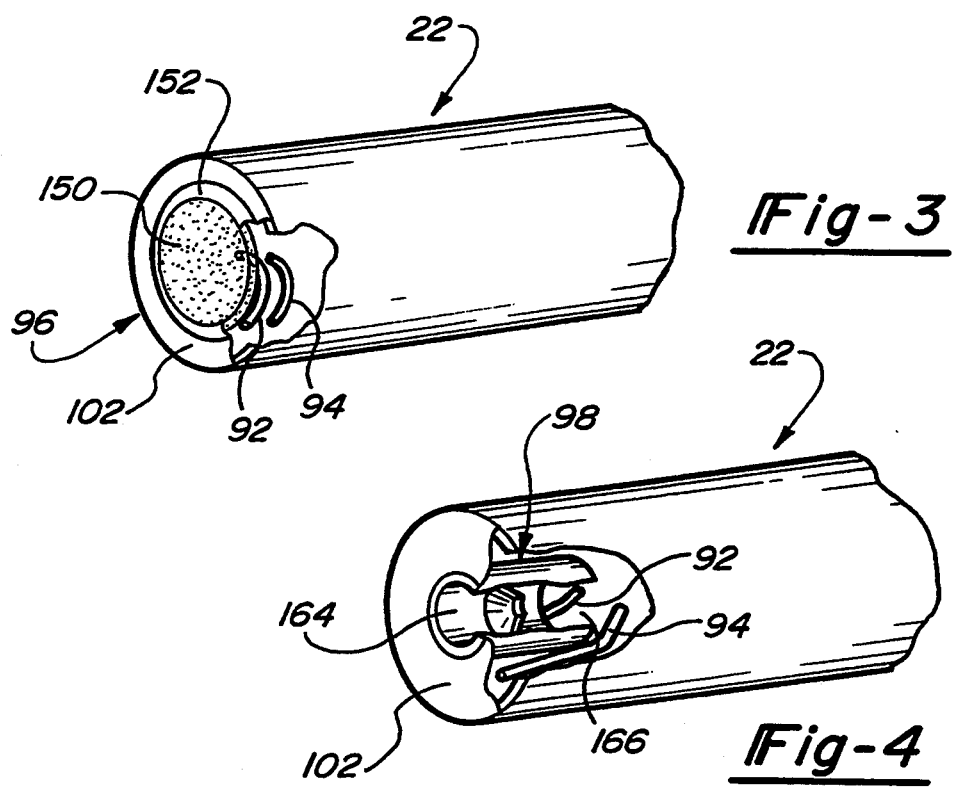
Fig-3
Fig-4

DEEP FRYING APPARATUS

BACKGROUND OF THE INVENTION

The present invention relates to a frying apparatus. More particularly, the present invention relates to a gas-fired frying apparatus for use in restaurants and institutional kitchens for frying fish, poultry, potatoes and other foods in a frypot containing frying oil.

BACKGROUND AND SUMMARY OF THE INVENTION

The current state of the art for deep fryers is apparatuses which are comprised of a vat or frypot in which a quantity of cooking oil is heated to a predetermined temperature for so called deep fat frying. There are several long standing concerns and problems associated with these types of apparatuses.

The first problem with the prior art deep fat frying apparatus is its relatively low efficiency as compared to modern day residential furnaces or commercial boilers. With the rising cost of fuel gas coupled with the question of its long term supply, it is imperative that a higher efficiency level for all fuel gas appliances be obtained. The apparatus within the present invention has addressed this issue by reaching a higher level of unit efficiency. The unique features of the pressurized combustion process within the present invention provides for an even higher level of efficiency by utilizing an auxiliary heat recovery system which can bring the units overall efficiency to approximately 90%.

Another concern with deep fat frying equipment is environmental issues. The future allowable emission levels for such equipment will surely be lower. This will present a problem for the restaurant/institutional kitchen because of the fact that this type of equipment is often one of the most widely used and most important cooking apparatuses within the operation. The apparatus in the present invention addresses this concern by producing lower emissions and the apparatus has the flexibility to further accommodate toxic emissions or materials via a catalytic converter.

An additional concern with deep fat frying equipment is the life/durability of the equipment. Deep fat fryers which are fueled by natural gas or other types of fuel gas are designed in such a way that the flame or hot products of combustion make contact with the fry pot itself. This contact results in a higher heat transfer, thereby increasing the units overall efficiency. This contact also results in a reduction in the life/durability of the fry pot. The heating/cooking/cooling cycle that the fry pot experiences causes metal fatigue which often occurs at the points where two pieces are welded together. The direct contact of the flame or hot gasses with the fry pot, followed by a cool down causes a hysteresis cycle on the metal and/or welds which can reduce the life of the fry pot or cause a premature failure of the weld. In order to increase the life/durability of the fry pot, the present invention avoids the direct contact between the metal and/or welds while still maintaining the high efficiency required by the unit.

Another concern with deep fat frying equipment is the accessibility to the equipment to adequately clean the equipment and replace the cooking oil. Deep fat fryers are used to cook foodstuff, and during the cooking process, a small amount of the foodstuff remains in the fryer and is allowed to gravitate to the bottom of the frypot for later removal. The cooking process of the foodstuffs in a deep fat fryer also causes a deterioration or breakdown of the cooking oil which after a time will need to be replaced. Thus, the accumulation of foodstuff in the bottom of the fry pot in conjunction with the deterioration of the cooking oil necessitates periodic cleaning of the fry pot and the changing of the cooking oil. If a particular design of fry pot includes a heating element, plates, tubes or the like permanently mounted in the fry pot, the cleaning efficiency and quality of the cleaning process will be inhibited. The present invention includes a combustion chamber and heat exchanger which resides inside the fry pot for cooking but it can easily be removed to facilitate cleaning, oil changing and foodstuff removal.

Still another concern with deep fat frying equipment is the overall taste and quality of the foodstuffs as all the above issues come to bear. Deep fat frying apparatuses used in restaurants and institutional kitchens, including so called fast food dispensers, must be capable of rapid warm up and maintaining a uniform temperature of the cooking oil over a specific time period including when relatively large loads of raw foodstuffs are placed in the frypot. These apparatuses must accommodate foodstuffs from potatoes to poultry, each with its own unique heating requirements, while maintaining consistency and uniformity of taste. Much research and testing has been done to determine the optimum frying time/temperature within a given cooking oil to ensure quality of taste. This invention provides for the pre-programming of a time/temperature function and, when combined with the unique features of the invented apparatus, will provide for precise control of these stringent time/temperature functions in a highly efficient manner. This flexibility ensures the quality of taste for a variety of foodstuffs with minimum energy consumption.

BRIEF DESCRIPTION OF THE DRAWINGS

The above-mentioned and other features and objectives of this invention and the manner of attaining them will become more apparent and the invention itself will be better understood by reference to the following description of the invention taken in conjunction with the accompanying drawings wherein:

FIG. 2 is a side elevation view, partially in cross section, of the burner, combustion chamber, heat exchangers and frypot of FIG. 1;

FIG. 3 is a perspective view of a surface combustion burner for use in the high pressure deep frying apparatus of FIG. 1;

FIG. 4 is a perspective view of a high pressure jet burner for use in the high pressure deep frying apparatus of FIG. 1;

DETAILED DESCRIPTION OF THE PREFERRED EMBODIMENT

Figure 1:
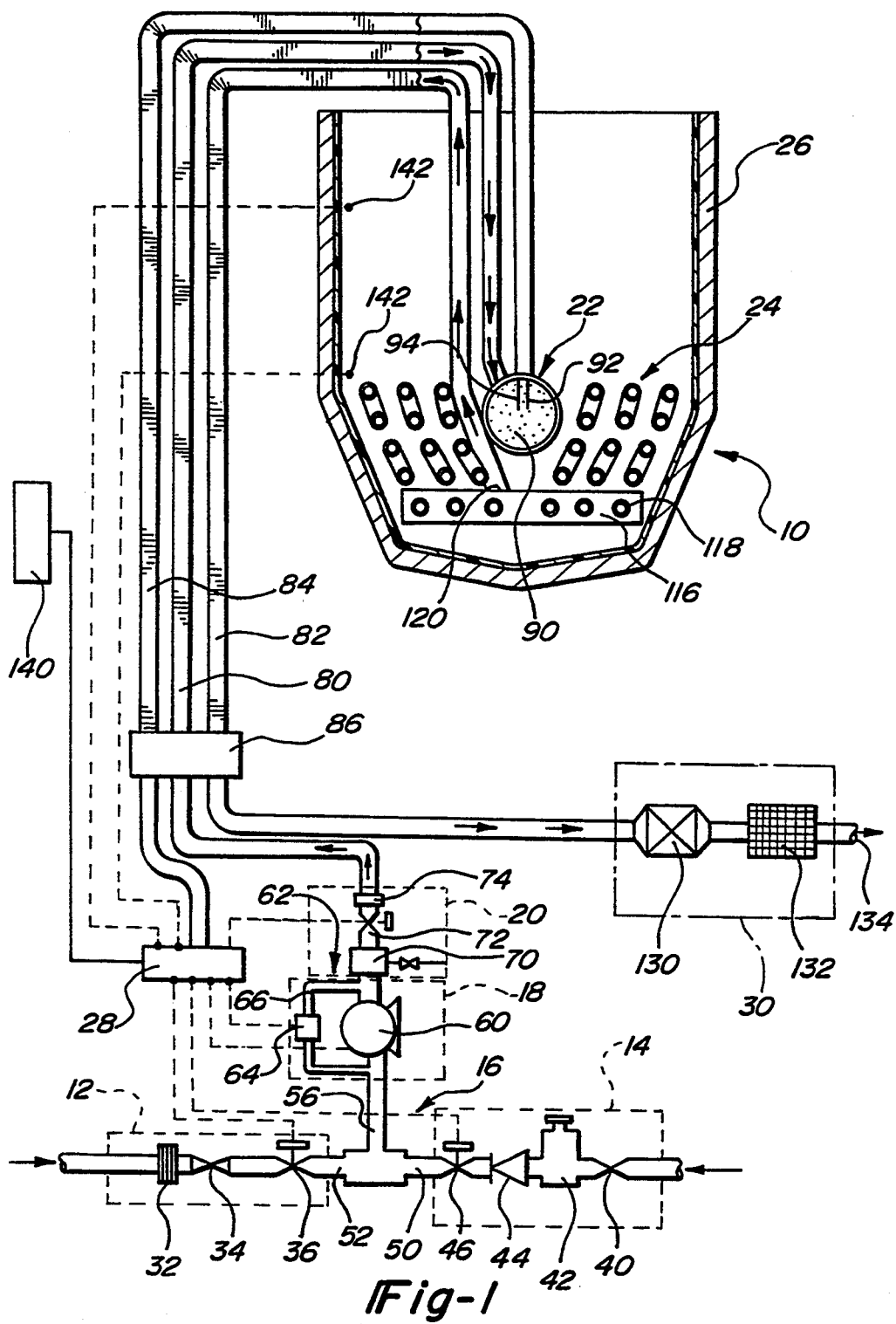
FIG. 1 is a schematic flow diagram and end view, partially in cross section, of a high pressure deep frying apparatus according to the present invention and embodying a controlled high efficient clean burning process.

Referring now to the drawings in which like reference numerals designate like or corresponding parts throughout the several views, there is shown in FIG. 1 a schematic diagram of a deep fat frying apparatus for use in restaurants and institutional kitchens for frying fish, poultry, potatoes and other foods in a frypot containing cooking oil according to the present invention and is designated by the reference numeral 10.

The deep fat frying apparatus is comprised of an air supply system 12, a fuel gas supply system 14, a mixing unit 16, a compressing system 18, a burner delivery system 20, a burner assembly 22, a heat exchanger 24, a fry pot 26, a central control unit 28 and an exhaust system 30.

Air is supplied by air supply system 12 to frying apparatus 10 through a filter 32 and the air which is supplied can be preheated air, fresh air or any combination of the two. The size and type of the filter 32 will depend on various parameters including the requirements of compressing system 18, and the incoming air quality/quantity. Air filter 32 will remove unwanted dust and other contaminating particles from the air stream and thereby protect mixing unit 16, compressing system 18, burner delivery system 20, burner assembly 22 and heat exchanger 24. A manually operated isolating valve 34 provides a means of turning off the air supply in the event of maintenance and/or an emergency shut down. A control valve 36 is activated through central control unit 28 and controls the supply of filtered air to the system. Control valve 36 would normally turn on and off and/or modulate the supply of air to the system. Isolating valve 34 is a secondary safety valve as the absence of air will terminate the combustion process.

Fuel gas supply system 14 is supplied with fuel gas from a direct piped supply (not shown) such as from a natural gas distribution company, or from storage tanks. Preferably, the fuel gas would be natural gas but it could be any other suitable fuel gas, such as propane. A manually operated isolating valve 40 provides a means of cutting off the supply of fuel gas to the remainder of the system. A governor 42 controls the pressure of the fuel gas to ensure the delivery of the air and fuel gas at pressures suitable for mixing. A check valve 44 is provided as a safety device to allow the flow of fuel gas in one direction only. As this is a pressurized system, a failure or loss of suction pressure will close check valve 44 and stop the flow of fuel gas. A control valve 46 is in series with governor 42 and in communication with central control unit 28 to turn on or off and/or modulate the supply of fuel gas. Control valve 46 in conjunction with air control valve 36 are used to ensure that the correct predetermined ratio of air and fuel gas is being supplied to mixing unit 16. Governor 42 is in communication with the air supply system 12 to adjust the system pressure and thereby ensure proper mixing. Isolating valve 40 and check valve 44 are additional safety devices to shut off the supply of fuel gas should an abnormal situation arise.

Figure 5:
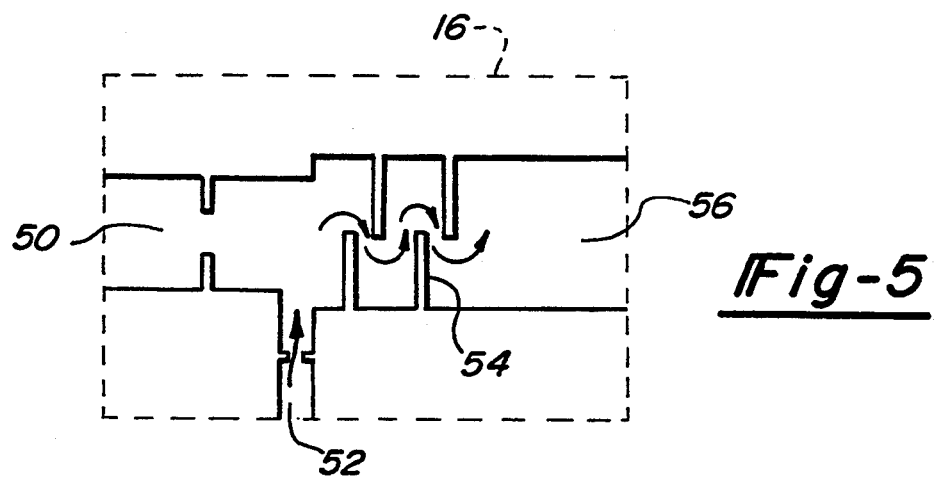
FIG. 5 is a sectional view of the mixing unit of the present invention.
Figure 6:
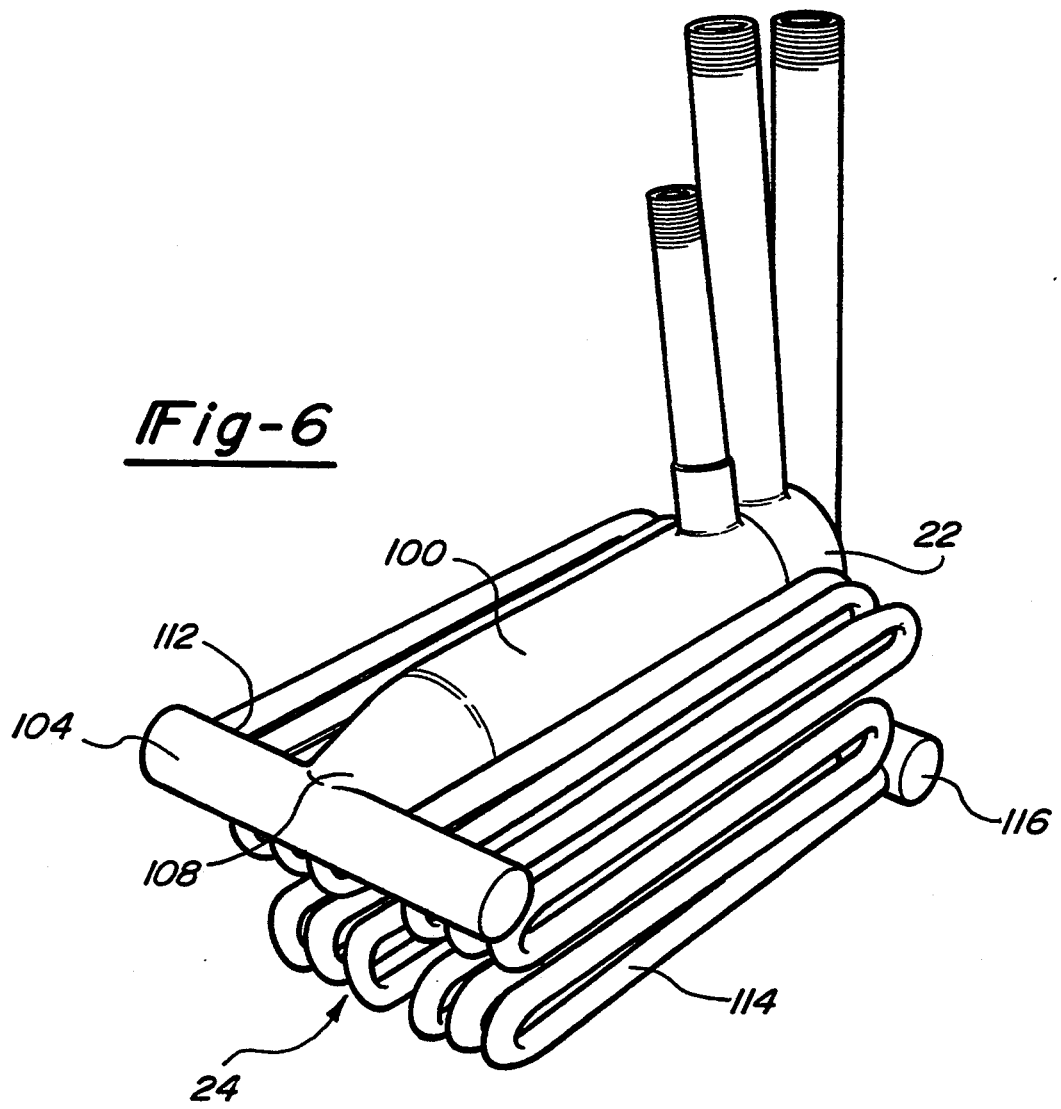
FIG. 6 is a perspective view of the burner assembly and heat exchange of the deep frying apparatus shown in FIG. 1.
Figure 7:
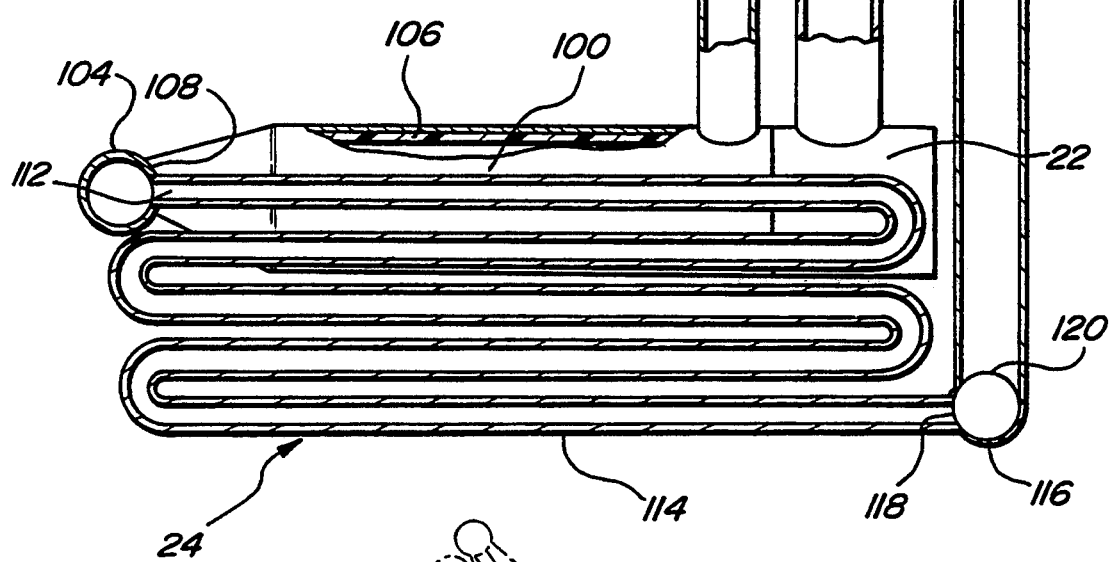
FIG. 7 is a side elevational view, partially in cross section, of the burner assembly and heat exchanger shown in FIG. 6.

Mixing unit 16 has a pair of inlet orifices 50 and 52, respectively, to receive the fuel gas and air. Mixing unit 16 mixes the two gasses by passing the fuel gas and air around and through a plurality of baffles 54, best shown in FIG. 5, to form a combustible gas premixture, and presents the gas premixture to a demand or input side 56 of compressing system 18. The combination of the suction from compressing system 18 and the design of mixing unit orifices 50 and 52 in conjunction with baffles 54 results in a thorough mixing of the air and fuel gas.

The compressing system 18 has input side 56 which leads to a compressor 60 which increases the pressure of the combustion premix to provide combustible gas to burner assembly 22 at super atmospheric pressure. Preferably and in accordance with this invention, this pressure would be between one half and fifteen PSIG. The size and type of compressor 60 is well known in the art and will be determined by the demand or capacity of the particular deep fat fryer.

Compressing system 18 also includes a feedback system 62 which is comprised of a pressure sensitive governor 64 and a return line 66 which is used with compressor 60 to control and balance the firing rate of frying apparatus 10 when frying apparatus 10 is operating in its various modes. Pressure sensitive governor 64 is controlled by central control unit 28 and determines the amount of premixed gas which will be recirculated through return line 66 and the amount of gas to available to burner assembly 22 to satisfy the fryer apparatus' requirements. This greatly enhances the units flexibility and its turndown characteristics. Likewise, this pressure sensitive governor 64 assures that a continuous non-pulsating flow of pressurized fuel gas premixture is supplied to burner assembly 22.

Burner delivery system 20 includes an oil trap 70 or coalescing filter to remove the oil from the combustion premixture. Oil trap 70 is provided between the outlet of compressor 60 and a control valve 72. Control valve 72 is controlled by central control unit 28 and determines the precise amount of premixed gas which will be delivered to burner assembly 22. A flame trap 74 is provided to stop the propagation of a backward flame from the burner that could damage the equipment. Flame trap 74 is a safety device to ensure that upon loss of pressure and/or a reduction in premix flow velocity, the combustion mixture will not create a flash back or back burn through the system.

Filter 32, isolating valves 34 and 40, control valves 36, 46 and 72, check valve 44 and the orifices are all commercially available items and are well known in the art. Compressor 60, oil trap 70 and pressure governors 42 and 64 are also commercially available items and are well known in the art.

As described up to this point, deep frying apparatus 10 is the same as that described in assignee's U.S. Letters Pat. No. 5,209,218 the disclosure of which is hereby incorporated herein by reference.

Burner assembly 22 and heat exchanger 24 are removably located within fry pot 26 as a single unit. A flexible fuel gas supply line 80 extends between burner delivery system 20 and burner assembly 22. A second flexible gas discharge line 82 extends between heat exchanger 24 and exhaust system 30. A third flexible line 84 extends between central unit 28 and burner assembly 22 to allow access to burner assembly 22 for the various control members as will be described later herein. A winding mechanism 86 can be provided between burner assembly 22 and burner delivery system 20, between heat exchanger 24 and exhaust system 30 and between burner assembly 22 and control unit 28 as shown in FIG. 1. Winding mechanism 86 insures that orderly management of lines 80, 82, and 84 is maintained as burner assembly 22 and heat exchanger 24 are moved into and out of fry pot 26 as will be described later herein.

Burner assembly 22 includes a burner element 90, an ignition source 92 for combusting the fuel gas/air premix, a safety flame sensor 94 to ensure that proper combustion occurs and is maintained and a combustion chamber 100. Burner assembly 22 operates by receiving and igniting the high velocity/pressurized gas premix with minimal pressure loss through burner element 90. As will be discussed herein, burner assembly 22 can be comprised of a porous fiber metallic surface combustion burner 96 or a jet nozzle burner 98. Combustion burner 96 and jet nozzle burner 98 will both achieve the required flame stability, have a desired pressure drop, and operate under the various operating conditions of the present invention.

The high velocity flame emanating from the burner 96 or 98 will be contained and the gas premix combustion reaction will be allowed to go to completion within cylindrically designed combustion chamber 100. Combustion chamber 100 is preferably 2" to 5" in diameter depending on the designed firing range and capacity of frying apparatus 10. Combustion chamber 100 extends from a front wall 102 to a manifold 104 of heat exchanger 24. The combustion chamber 100 has a layer of insulating material 106 which is preferably between $\frac{1}{8}$" thick to $\frac{3}{8}$" thick depending on the designed firing range and the fryer's capacity. Insulating material 106 starts at front wall 102 of chamber 100 and is attached to an inside wall of the combustion chamber 100. Insulating material begins at the intersection of combustion chamber 100 and burner assembly 22 and preferably continues along the entire length of combustion chamber 100. A suitable insulating material for use in the combustion chamber is well known by those skilled in the art.

Combustion chamber 100 is tapered from front wall 102 to manifold 104 as shown in FIG. 2. The taper is such that the diameter of combustion chamber 100 at manifold 104 is approximately 50% of the diameter of combustion chamber 100 at front wall 102. The tapered design and insulation of combustion chamber 100 is necessary to ensure that the combustion process goes to completion in an efficient manner while producing a minimum level of pollutants, to ensure that the resultant heat can be used in an efficient manner to heat the required space and to ensure that the pressurized combustion process occurs at the lowest possible noise level.

The high velocity products of combustion exiting combustion chamber 100 enter into manifold 104. Manifold 104 is connected to combustion chamber 100 at inlet 108 and manifold 104 is connected to heat exchanger 24 at a plurality of outlets 112. Heat exchanger 24 is comprised of a plurality of individual tubes/pipes 114. Tubes/pipes 114 extend generally horizontally from manifold 104 and then curve downward in an oscillating pattern from manifold 104 to a manifold 116. Tubes/pipes 114 are connected at their exit end to manifold 116 at a plurality of inlets 118. Manifold 116 further defines an outlet 120 for exiting the combustion gasses to exhaust system 30.

The positioning of burner assembly 22 and combustion chamber 100 at the upper portion of heat exchanger 24 promotes the settling or gravitating of the small amount of foodstuff remaining in the fryer to the bottom of frypot 26 for later removal. Combustion chamber 100 and the upper portion of heat exchanger 24 will be hotter than the lower portion of heat exchanger 24 due to the transfer of heat into the cooking oil. Thus, the temperature of the cooking oil located near the upper portion of heat exchanger 24 will be somewhat higher than the temperature of the cooking oil located near the lower portion of heat exchanger 24. This temperature gradient promotes the settling or gravitation of the foodstuff to the bottom of frypot 26 and also has a tendency to keep the foodstuff in the bottom of frypot 26 until its removal from frypot 26.

Exhaust system 30 comprises gas discharge line 82 that will either connect to an exhaust vent (not shown) or it will connect to a secondary heat recovery system 130 where any residual heat can be recovered for use to pre-heat the incoming air or for other purposes. The combustion gasses can then be exhausted to the outside and/or can be sent through a fine particle separator/catalytic converter 132 to remove pollutants prior to outside exhausting. If insufficient pressure/velocity exist to effectively move the combustion gasses through secondary heat recovery system 130 or fine particle separator/catalytic converter 132, an induced draw motor (not shown) can be used. Heat recovery system 130 and/or catalytic converter 132 are of a design which requires a low pressure drop.

Frypot 26, as shown in FIG. 1, is a metal box-like structure. Prior art frypots were required to be constructed from a relatively thick or heavy duty metal material due to the fact that the heating element for the cooking oil was located exterior to or integral with the frypot requiring heat transfer cycles through the frypot structure itself. The present invention, by having burner assembly 22 and heat exchanger 24 located within the cooking oil, does not require the transfer of heat through any portion of frypot 26. Thus, frypot 26 may be constructed from a metal stamping as shown in FIG. 1 or from a plastic material, composite material or a ceramic material as shown by frypot 26' in FIG. 2. The material for frypot 26 or 26' must be able to withstand normal cooking oil temperatures which range from 400° to 500° F. but frypot 26 or 26' are not required to withstand the direct heat of combustion. Plastic materials capable of withstanding these temperatures are well known in the art.

Frypot 26 and 26' are shown with optional insulation such that overall energy loss is held to a minimum. A suitable insulating material for use on the frypot is well known by those skilled in the art.

Central control unit 28 ensures that the correct volume and desired mixture of gasses are supplied to mixing unit 16 according to pre-programmed time/temperature functions stored in control panel 140. A plurality of temperature probes 142 are positioned within the frypot 26 to indicate the current temperature of the cooking oil. Control panel 140 sets the operating parameters and controls them via central control unit 28 which also controls the various operating modes of fat frying apparatus 10. Exhaust system 30 is also provided, as discussed above, where the combustion gasses are expelled and/or further processed by secondary heat recovery system 130 and/or a catalytic converter 132 to reduce pollutants before being exhausted to the atmosphere at 134.

FIG. 3 shows one embodiment of burner assembly 22 according to the present invention and is illustrated as surface combustion burner 96 which is formed of a gas permeable fiber metallic material 150. Suitable fiber metallic materials include Fercalloy a Registered Trademark of and available from U. K. Atomic Energy Authority, U. K., and Behifor, Bekinox, Bekitex and Bekitherm, all Registered Trademarks of and available from N. V. Bekaert, S. A., Belgium. Fiber metallic material 150 is held in the burner assembly by a retainer 152 which is connected to front plate 102 of combustion chamber 100. Ignition source 92 and flame sensor 94 are routed to combustion chamber 100 through flexible line 84 so that they reside in front of fiber metallic material 150 to ignite the high velocity/super atmospheric premix emanating from the burner surface and monitor the combustion for safe operation of burner assembly 22. The high velocity/super atmospheric combustion phenomenon along with the nature of the fiber metallic burner results in a faster rate of combustion reaction, and thereby produces less unwanted pollutants such as $No_x$.

FIG. 4 is directed to another embodiment of burner assembly 22 according to the present invention and is illustrated as cylindrical jet nozzle burner 98. Cylindrical jet nozzle burner 98 is connected to combustion chamber front plate 102. The high velocity/super atmospheric premix is presented to burner 98 at an inlet 164. The premix gasses travel through uniquely designed angular orifices inside burner 98 and are presented to ignitor 92 for ignition of the combustible premix. The jet flame emanating from a front opening 166 of burner 98 continues into combustion chamber 100. Flame sensor 94, a safety device, resides in front of jet nozzle burner front opening 166 to ensure ignition occurs. Both of the above described burner designs result in a minimum pressure drop.

FIGS. 8 through 11 illustrate various mechanisms which can be utilized in order to allow burner assembly 22 and heat exchanger 24 to be removed from fry pot 26. While FIGS. 8 through 11 depict various mechanisms, it is to be understood that the mechanisms illustrated are exemplary in nature and are not to be considered limiting. The removal of burner assembly 22 and heat exchanger 24 from fry pot 26 can be accomplished by any mechanism known by those skilled in the art.

Figure 8:
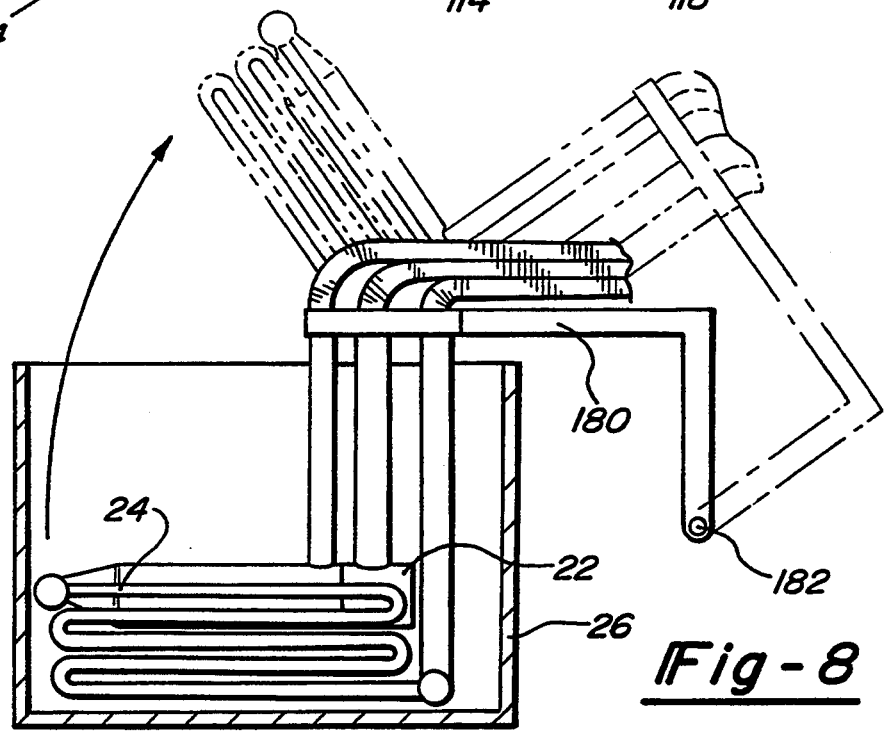
FIG. 8 is an end view of the deep frying apparatus showing a pivotable burner assembly and heat exchanger.

FIG. 8 illustrates a mechanism 180 which allows for the pivoting of burner assembly 22 and heat exchanger 24 about a point 182 for removal from fry pot 26.

Figure 9:
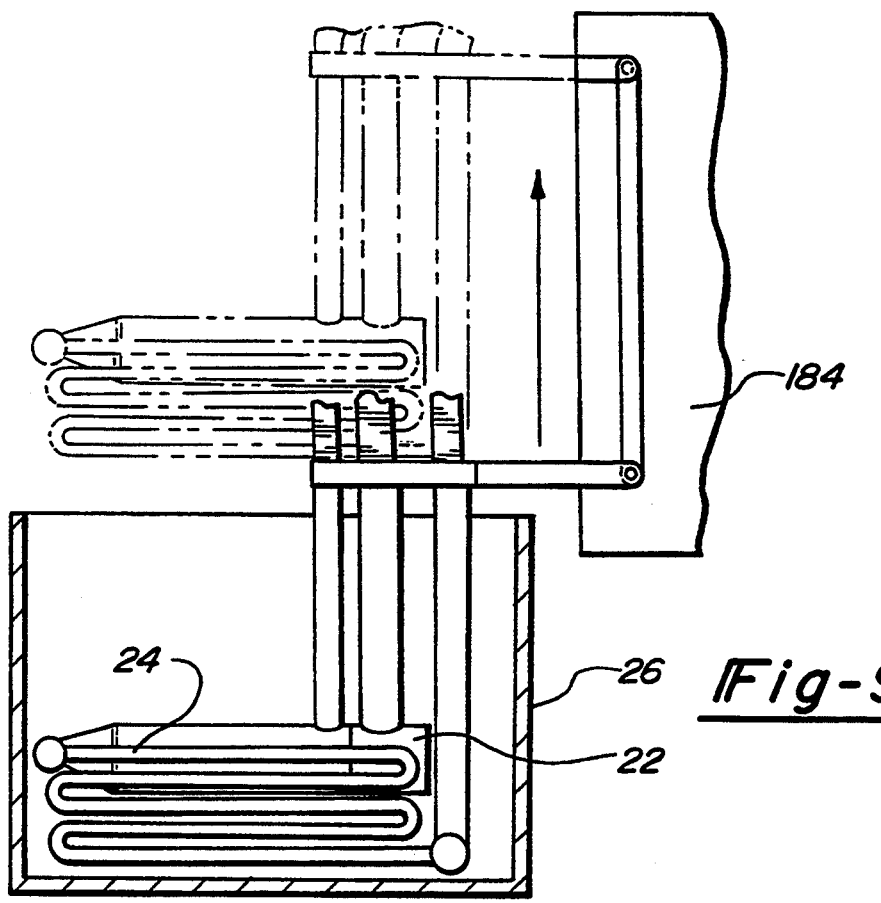
FIG. 9 is an end view of the deep frying apparatus showing a vertically movable burner assembly and heat exchanger.

FIG. 9 illustrates a mechanism 184 which allows for the verticle movement of burner assembly 22 and heat exchanger 24 from fry pot 26.

Figure 10:
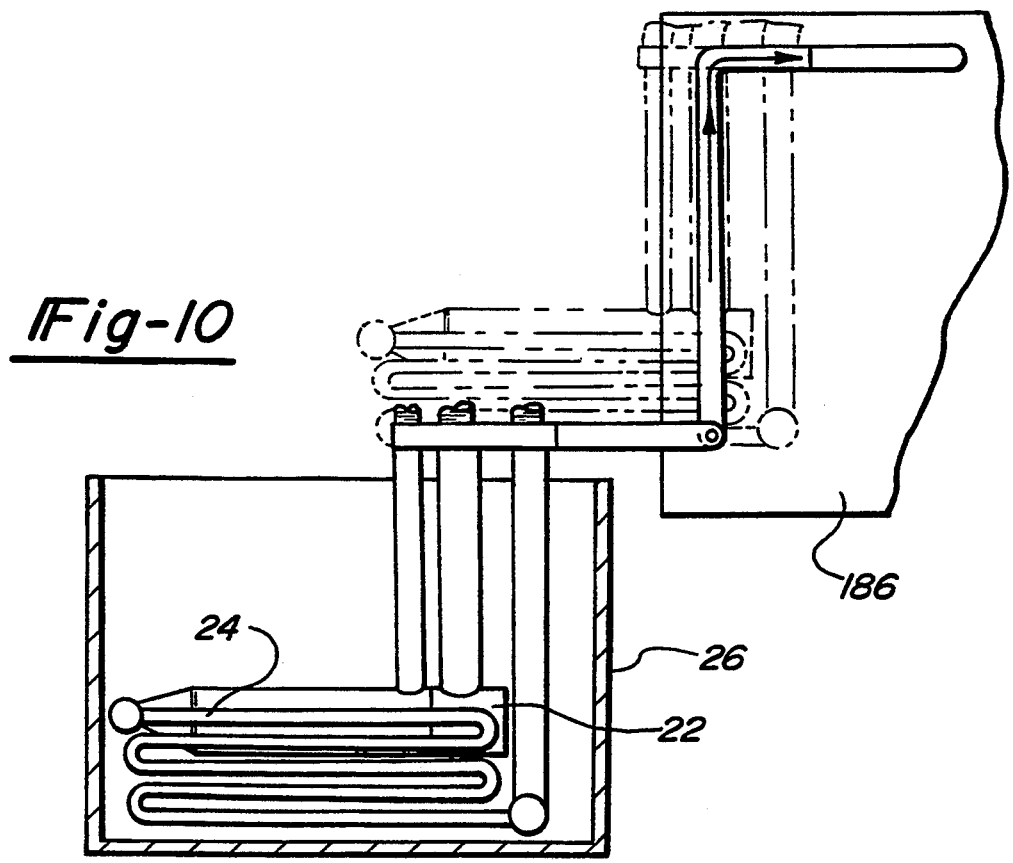
FIG. 10 is an end view of the deep frying apparatus showing a vertically and horizontally movable burner assembly and heat exchanger.

FIG. 10 illustrates a mechanism 186 which allows for the verticle and horizontal movement of burner assembly 22 and heat exchanger 24 from fry pot 26.

Figure 11:
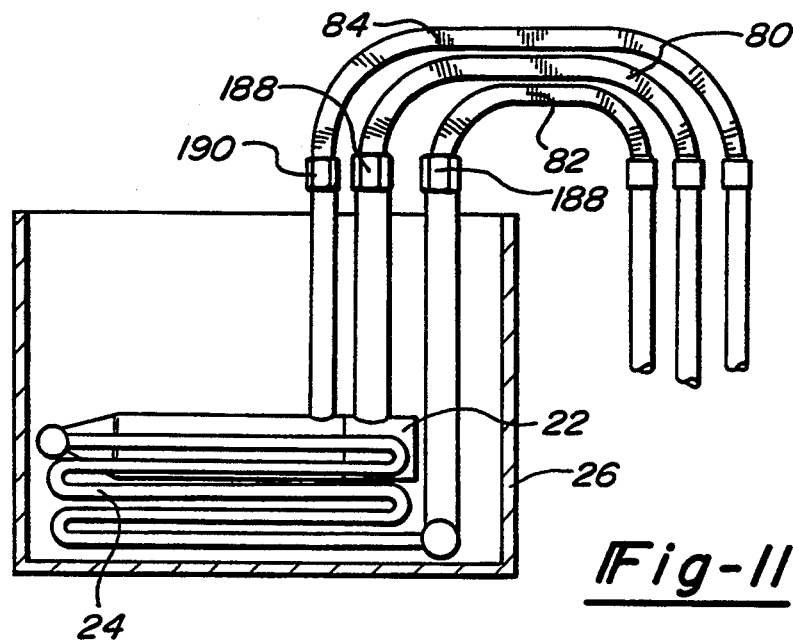
FIG. 11 is an end view of the deep frying apparatus showing a burner assembly and heat exchanger which utilize quick disconnect couplings to allow for their removal from the fry pot.

FIG. 11 illustrates the attachment of lines 80, 82 and 84 using a quick disconnect coupling 188 for the gas lines and an electrical quick disconnect coupling 190 for the ignitor and sensor. In order to remove burner assembly 22 and heat exchanger 24 from fry pot 26, quick disconnect couplings 188 and 190 are released and burner assembly 22 and heat exchanger 24 are lifted from fry pot 26.

Figure 12:
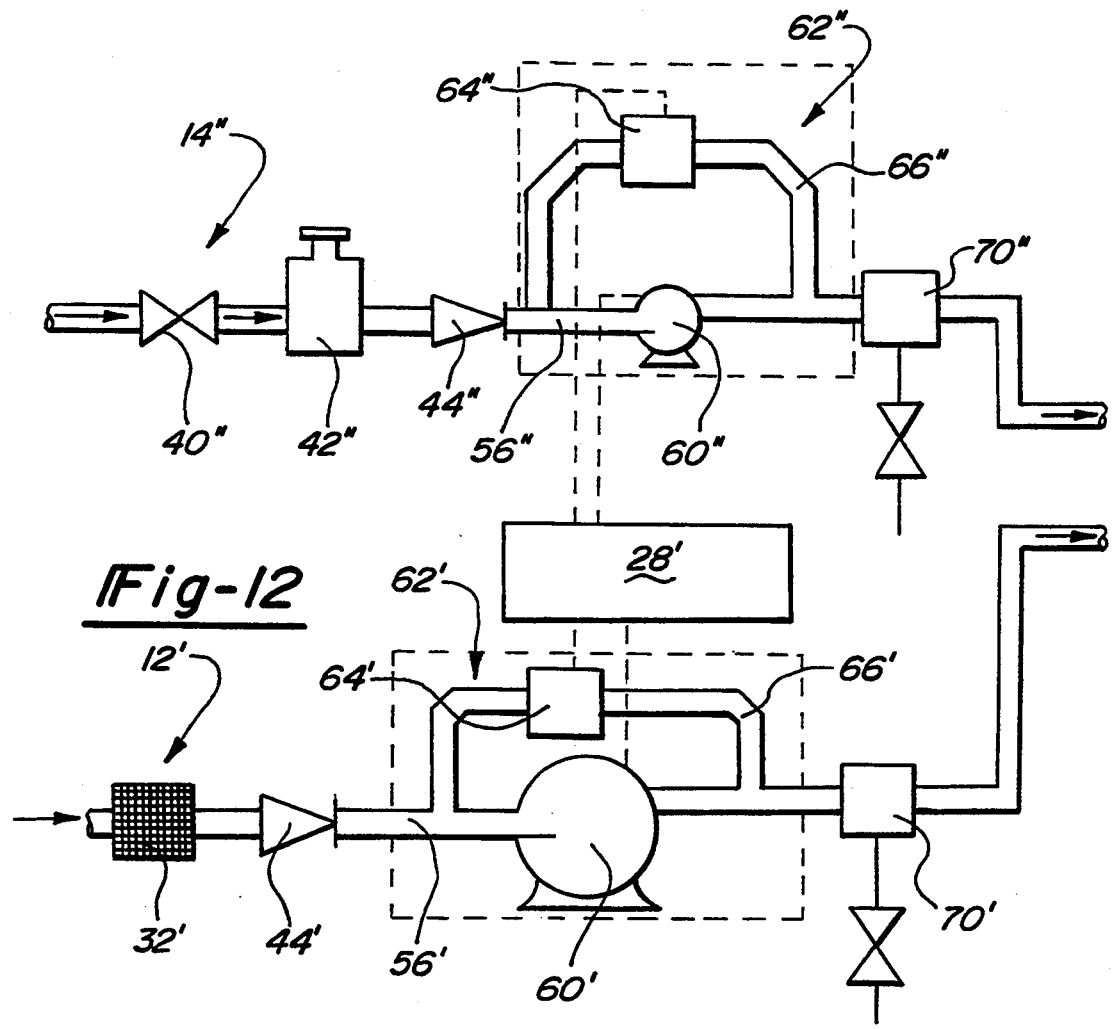
FIG. 12 is a schematic flow diagram of another embodiment of a system for supplying fuel gas and air to the burner system for the high pressure deep frying apparatus in accordance with the present invention.

FIG. 12 is a schematic view of another embodiment of the systems for controlling the supply of air and fuel gas to the combustion burner. In the description of the systems of FIG. 12 primed (') and double primed (") numbers will be used with the reference numerals when the component is equivalent to a component as described in connection with the control system of FIGS. 1 and 2.

In the control system of FIG. 12 the air and fuel gas supply systems 12' and 14" respectively each have their own separate compressor subsystem. Air supply flows through a filter 32' that is of the size and type which is needed for the particular frying apparatus 10. This will depend on a number of parameters such as the quality/quantity of the incoming air and the compressor requirements. The air exits the filter and proceeds through a check valve 44' which is used as a safety device. This will close the supply of air to the remainder of the system if insufficient pressure exist to open the valve. Pressure loss, compressor failure or a number of other occurrences could cause valve 44' not to open and thereby starve the combustion premix of the required air. The air supply passes through check valve 44' to a suction side 56' of a compressor 60'. A feedback system 62', including a bypass line 66' and a pressure sensitive governor 64', is provided whereby a portion of the exiting compressed air can be recirculated back to the suction side of the compressor 60'. The volume of air recirculating through feedback system 62' is controlled by governor 64', which in turn is controlled by central control unit 28'. Feedback system 62' ensures that the proper amounts of compressed air is supplied to the mixing unit (not shown) and subsequently the burner assembly for clean efficient combustion, to support the deep fryer's firing rate, and to ensure smooth non-pulsating combustion. The super atmospheric air exiting the compressor travels through an oil trap 70' prior to entering the mixing unit. This oil trap is similar to the one described in FIG. 1 and serves the same purpose.

Fuel gas flows through an isolating valve 40", which provides for a manual shut off of the fuel gas supply. This could be for maintenance or for emergency reasons. From isolating valve 40" the fuel gas goes through a pressure governor 42" which regulates the volumetric flow of fuel gas and air at the required pressure. A second safety check valve 44" is located prior to a suction side 56" of a compressor 60" provided for the fuel gas. An oil trap 70" is located down stream of the outlet side of the compressor 60". Check valve 44" will cut off the fuel supply if there is insufficient pressure to open the valve. Compressor 60", its recirculating feedback system 62", and oil trap 70" are similar and provide the same function as the components described in the single compressor air supply system of FIG. 1.

The compressed air leaving air supply system 12' and the compress fuel gas leaving fuel gas supply system 14" enter a mixing unit (not shown) similar to mixing unit 16 of FIG. 1. After the mixing unit, the compressed fuel gas/air mixture goes through a control valve (not shown) similar to control valve 72 of FIG. 1 and through a flame trap (not shown) similar to the flame trap 74 of FIG. 1 prior to entering burner assembly 22.

If the air is available at the required or higher pressure in sufficient quantity to support combustion, air supply system 12' shown in FIG. 12 would only be comprised of a throughput air flow regulator and a control valve, which are not shown, instead of compressor 60' and feedback system 62'. The air flow regulator would provide the air at the required pressure and would work in tandem with fuel gas pressure governor 42" while the air control valve would control the flow of air based on the input from the central control unit 28'. A flow control metering valve, which is not shown, is disposed in each of the air and fuel gas lines. These metering valves are operatively connected to a flow ratio controller, also not shown, which is operatively connected to control unit 28'. An actuator sends a signal to the air control valve to adjust the air volume as needed.

Further, if the fuel gas is available in sufficient quantity and at the required or higher pressure to support combustion, the fuel gas supply system 14" shown in FIG. 12 would only be comprised of a regulator, a pressure governor and a control valve all of which are not shown. These components work in the same fashion and perform the lo same function as described above for the air system.

While the above detailed description describes the preferred embodiment of the present invention, it should be understood that the present invention is susceptible to modification, variation and alteration without deviating from the scope and fair meaning of the subjoined claims.

What is claimed is:

1. A clean burning gas flame frying apparatus for cooking foods comprising:
    a frypot for holding cooking oil;
    burner means for combusting a fuel gas and air premixture for providing heat;
    means for supplying air to said burner means;
    means for supplying fuel gas to said burner means;
    a mixing unit for said air and said fuel gas having an air inlet, a fuel gas inlet and an outlet, said mixing unit operable to create said fuel gas and air premixture, said mixing unit disposed between said burner means and said air and fuel gas supply means;
    means for compressing said premixture and introducing said premixture to said burner means at a specified velocity, said compressing means disposed between said mixing unit and said burner means;
    a combustion chamber associated with said burner means, said combustion chamber supporting combustion by balancing said premixture velocity with the flame velocity such that smooth and complete combustion occurs;
    a heat exchanger mated with said combustion chamber for transferring heat to said cooking oil, said heat exchanger being removably located within said frypot;
    means for exhausting the products of said combustion, said exhausting means mated with said heat exchanger; and
    means for controlling the rate of combustion in order to maintain an overall higher efficiency of operation.

2. The gas flame frying apparatus of claim 1 wherein said means for supplying air comprises:
    a filter;
    an isolating valve engaged with said filter and operable to shut off said air supply to said mixing unit; and
    a control valve engaged with both said isolating valve and said mixing unit, said control valve being in communication with said control means and operable to vary the flow rate of said air available to said mixing unit.

3. The gas flame frying apparatus of claim 1 wherein said means for supplying fuel gas comprises:
    an isolating valve operable to shut off said fuel gas supply to said mixing unit;
    a governor engaged with said isolating valve and in communication with both said air supply means and said control means and operable to adjust the pressure of said fuel gas to insure proper mixing;
    a check valve engaged with said governor and operable to allow the flow of said fuel gas in one direction only; and
    a control valve engaged with both said check valve and said mixing unit, said control valve being in communication with said control means and operable to vary the flow rate of said fuel gas available to said mixing unit.

4. The gas flame frying apparatus of claim 1 wherein said compressing means comprises:
    a compressor engaged with said outlet of said mixing unit, said compressor having an input side and a pressure side;
    a feed back line engaged with said compressor for returning a portion of said premixture from said pressure side of said compressor to said input side of said compressor;
    a pressure governor engaged with said feed back line and in communication with said control means for varying the amount of premixture delivered to said burner means;
    an oil trap engaged with said compressor for removing oil from said premixture;
    a control valve engaged with said oil trap and in communication with said control means, said control valve operable to vary the flow rate of said premixture available to said burner means; and
    a flame trap engaged with both said control valve and said burner means, said flame trap operable to prohibit a back burn or flash back through said compressing means.

5. The gas flame frying apparatus of claim 1 wherein said burner means comprises:
    a fiber metallic burner;
    means for igniting said fuel gas and air premixture; and
    means for sensing said flame.

6. The gas flame frying apparatus of claim 1 wherein said burner means comprises:
    a jet nozzle burner;
    means for igniting said fuel gas and air premixture; and
    means for sensing said flame.

7. The gas flame frying apparatus of claim 1 wherein said burning means operates with a premixture pressure between one half and fifteen PSIG.

8. The gas flame frying apparatus of claim 1 wherein said heat exchanger comprises:
    a combustion manifold mated with said combustion chamber;
    an exhaust manifold mated with said exhausting means; and
    a plurality of tubes disposed between and interconnecting said combustion manifold and said exhaust manifold.

9. The gas flame frying apparatus of claim 1 wherein said controlling means comprises:
   a central control unit; and
   means for storing said plurality of heating cycles in communication with said central control unit such that said storing means provides information to said central control unit to control said rate of combustion.

10. The gas flame frying apparatus of claim 1 wherein said exhausting means includes an external heat recovery system for removal of residual heat energy.

11. The gas flame frying apparatus of claim 1 wherein said exhausting means includes a catalytic converter to remove toxic materials from said products of combustion.

12. The gas flame frying apparatus of claim 1 wherein at least a portion of said heat exchanger is disposed below said combustion chamber.

13. The gas flame frying apparatus of claim 1 wherein said frypot is a plastic material.

14. The gas flame frying apparatus of claim 1 wherein said frypot is a composite material.

15. The gas flame frying apparatus of claim 1 wherein said frypot is a ceramic material.

16. A clean burning gas flame frying apparatus for cooking foods comprising;
   a frypot for holding cooking oil;
   burner means for combusting a fuel gas and air premixture for providing heat;
   means for supplying pressurized air to said burner means;
   means for supplying pressurized fuel gas to said burner means;
   a mixing unit for said pressurized air and said pressurized fuel gas having an air inlet, a fuel gas inlet and an outlet, said mixing unit operable to create said fuel gas and air premixture, said mixing unit disposed between said burner means and said pressurized air and pressurized fuel gas supply means;
   a combustion chamber associated with said burner means, said combustion chamber supporting combustion by balancing said premixture velocity with the flame velocity such that smooth and complete combustion occurs;
   a heat exchanger mated with said combustion chamber for transferring heat to said cooking oil, said heat exchanger being removably located within said fry pot;
   means for exhausting the products of said combustion, said exhausting means mated with said heat exchanger; and
   means for controlling the rate of combustion in order to maintain an overall higher efficiency of operation.

17. The gas flame frying apparatus of claim 16 wherein said means for supplying pressurized air comprises:
   a filter;
   an air flow regulator engaged with said filter and operable to vary the pressure of said pressurized air supply to said mixing unit; and
   a control valve engaged with both said air flow regulator and said mixing unit, said control valve being in communication with said control means and operable to vary the flow rate of said air available to said mixing unit.

18. The gas flame frying apparatus of claim 16 wherein said means for supplying pressurized fuel gas comprises:
   a regulator operable to vary the pressure of said pressurized fuel gas supply to said mixing unit;
   a governor engaged with said regulator and in communication with both said air supply means and said control means and operable to adjust the pressure of said fuel gas to insure proper mixing; and
   a control valve engaged with both said governor and said mixing unit, said control valve being in communication with said control means and operable to vary the flow rate of said fuel gas available to said mixing unit.

19. The gas flame frying apparatus of claim 16 wherein said burner means comprises:
   a fiber metallic burner;
   means for igniting said fuel gas and air premixture; and
   means for sensing said flame.

20. The gas flame frying apparatus of claim 16 wherein said burner means comprises:
   a jet nozzle burner;
   means for igniting said fuel gas and air premixture; and
   means for sensing said flame.

21. The gas flame frying apparatus of claim 16 wherein said burning means operates with a premixture pressure between one half and fifteen PSIG.

22. The gas flame frying apparatus of claim 16 wherein said heat exchanger comprises:
   a combustion manifold mated with said combustion chamber;
   an exhaust manifold mated with said exhausting means; and
   a plurality of tubes disposed between and interconnecting said combustion manifold and said exhaust manifold.

23. The gas flame frying apparatus of claim 16 wherein said controlling means comprises:
   a central control unit; and
   means for storing said plurality of heating cycles in communication with said central control unit such that said storing means provides information to said central control unit to control said rate of combustion.

24. The gas flame frying apparatus of claim 16 wherein said exhausting means includes an external heat recovery system for removal of residual heat energy.

25. The gas flame frying apparatus of claim 16 wherein said exhausting means includes a catalytic convertor to remove toxic materials from said products of combustion.

26. The gas flame frying apparatus of claim 16 wherein at least a portion of said heat exchanger is disposed below said combustion chamber.

27. The gas flame frying apparatus of claim 16 wherein said frypot is plastic.

28. A clean burning gas flame frying apparatus for cooking foods comprising:
   a frypot for holding cooking oil;
   burner means for combusting a fuel gas and air premixture for providing heat;
   means for supplying air to said burner means;
   means for supplying fuel gas to said burner means;
   a mixing unit for said air and said fuel gas having an air inlet, a gas inlet and an outlet, said mixing unit operable to create said fuel gas and air premixture, said mixing unit disposed between said burner means and said means for supplying air and fuel gas;

means for compressing said air, said air compressing means disposed between said means for supplying air and said mixing unit;

means for compressing said fuel gas, said fuel gas compressing means disposed between said means for supplying fuel gas and said mixing unit;

a combustion chamber associated with said burner means, said combustion chamber supporting combustion by balancing said premixture velocity with the flame velocity such that smooth and complete combustion occurs;

a heat exchanger mated with said combustion chamber for transferring heat to said cooking oil, said heat exchanger being removably located within said fry pot;

means for exhausting the products of said combustion, said exhausting means mated with said heat exchanger; and means for controlling the rate of combustion in order to maintain an overall higher efficiency of operation.

29. The gas flame frying apparatus of claim 28 wherein said means for supplying air comprises:
a filter; and
a check valve engaged with both said filter and said means for compressing said air, said check valve operable to allow the flow of said air in one direction only.

30. The gas flame frying apparatus of claim 28 wherein said means for supplying fuel gas comprises:
an isolating valve operable to shut off said fuel gas supply to said means for compressing said fuel gas;
a governor engaged with said isolating valve and in communication with both said air supply means and said control means and operable to adjust the pressure of said fuel gas to insure proper mixing; and
a check valve engaged with both said governor and said means for compressing said fuel gas, said check valve operable to allow the flow of said fuel gas in one direction only.

31. The gas flame frying apparatus of claim 28 wherein said means for compressing said air comprises:
a compressor engaged with said means for supplying air, said compressor having an input side and a pressurized side;
a feedback line engaged with said compressor for returning a portion of said air from said pressure side of said compressor to said input side of said compressor;
a pressure governor engaged with said feedback line and in communication with said control means for varying the amount of air delivered to said mixing unit; and
an oil trap engaged with both said compressor and said mixing unit for removing oil from said air.

32. The gas flame frying apparatus of claim 28 wherein said means for compressing said fuel gas comprises:
a compressor engaged with said means for supplying fuel gas, said compressor having an input side and a pressure side;
a feedback line engaged with said compressor for returning a portion of said fuel gas from said pressure side of said compressor to said input side of said compressor;
a pressure governor engaged with said feedback line and in communication with said control means for varying the amount of fuel gas delivered to said mixing unit; and
an oil trap engaged with both said compressor and said mixing unit for removing oil from said fuel gas.

33. The gas flame frying apparatus of claim 28 wherein said heat exchanger comprises:
a combustion manifold mated with said combustion chamber;
an exhaust manifold mated with said exhausting means; and
a plurality of tubes disposed between and interconnecting said combustion manifold and said exhaust manifold.

34. The gas flame frying apparatus of claim 28 wherein said burner means comprises:
a fiber metallic burner;
means for igniting said fuel gas and air premixture; and
means for sensing said flame.

35. The gas flame frying apparatus of claim 28 wherein said burner means comprises:
a jet nozzle burner;
means for igniting said fuel gas and air premixture; and
means for sensing said flame.

36. The gas flame frying apparatus of claim 28 wherein said burning means operates with a premixture pressure between one half and fifteen PSIG.

37. The gas flame frying apparatus of claim 28 wherein said controlling means comprises:
a central control unit; and
means for storing said plurality of heating cycles in communication with said central control unit such that said storing means provides information to said central control unit to control said rate of combustion.

38. The gas flame frying apparatus of claim 28 wherein said exhausting means includes an external heat recovery system for removal of residual heat energy.

39. The gas flame frying apparatus of claim 28 wherein said exhausting means includes a catalytic convertor to remove toxic materials from said products of combustion.

40. The gas flame frying apparatus of claim 28 wherein at least a portion of said heat exchanger is disposed below said combustion chamber.

41. The gas flame frying apparatus of claim 28 wherein said frypot is a plastic material.

42. The gas flame frying apparatus of claim 28 wherein said frypot is a composite material.

43. The gas flame frying apparatus of claim 28 wherein said frypot is a ceramic material.

44. A clean burning gas flame frying apparatus for cooking foods comprising:
a frypot for holding cooking oil;
burner means for combusting a fuel gas and air premixture for providing heat;
means for supplying air to said burner means;
means for supplying fuel gas to said burner means;
means for compressing said air and said fuel gas to form a pressurized premixture and introducing said premixture to said burner means at a specified velocity, said compressing means disposed between said burner means and said air and fuel gas supplying means;

a combustion chamber associated with said burner means, said combustion chamber supporting combustion by balancing said premixture velocity with the flame velocity such that smooth and complete combustion occurs; and a heat exchanger mated with said combustion chamber for transferring heat to said cooking oil, said heat exchanger being removably located within said frypot.

45. The gas flame frying apparatus of claim 44 wherein said means for supplying air comprises:

a filter;

an isolating valve engaged with said filter and operable to shut off said air supply to said mixing unit; and a control valve engaged with both said isolating valve and said mixing unit, said control valve being in communication with said control means and operable to vary the flow rate of said air available to said mixing unit.

46. The gas flame frying apparatus of claim 44 wherein said means for supplying fuel gas comprises:

an isolating valve operable to shut off said fuel gas supply to said mixing unit;

a governor engaged with said isolating valve and in communication with both said air supply means and said control means and operable to adjust the pressure of said fuel gas to insure proper mixing;

a check valve engaged with said governor and operable to allow the flow of said fuel gas in one direction only; and a control valve engaged with both said check valve and said mixing unit, said control valve being in communication with said control means and operable to vary the flow rate of said fuel gas available to said mixing unit.

47. The gas flame frying apparatus of claim 44 wherein said compressing means comprises:

a compressor engaged with said outlet of said mixing unit, said compressor having an input side and a pressure side;

a feed back line engaged with said compressor for returning a portion of said premixture from said pressure side of said compressor to said input side of said compressor;

a pressure governor engaged with said feed back line and in communication with said control means for varying the amount of premixture delivered to said burner means;

an oil trap engaged with said compressor for removing oil from said premixture;

a control valve engaged with said oil trap and in communication with said control means, said control valve operable to vary the flow rate of said premixture available to said burner means; and a flame trap engaged with both said control valve and said burner means, said flame trap operable to prohibit a back burn or flash back through said compressing means.

48. The gas flame frying apparatus of claim 44 wherein said burner means comprises:

a fiber metallic burner;

means for igniting said fuel gas and air premixture; and means for sensing said flame.

49. The gas flame frying apparatus of claim 44 wherein said burner means comprises:

a jet nozzle burner;

means for igniting said fuel gas and air premixture; and means for sensing said flame.

50. The gas flame frying apparatus of claim 44 wherein said burning means operates with a premixture pressure between one half and fifteen PSIG.

51. The gas flame frying apparatus of claim 44 wherein said heat exchanger comprises:

a combustion manifold mated with said combustion chamber;

an exhaust manifold mated with said exhausting means; and a plurality of tubes disposed between and interconnecting said combustion manifold and said exhaust manifold.

52. The gas flame frying apparatus of claim 44 wherein said controlling means comprises:

a central control unit; and means for storing said plurality of heating cycles in communication with said central control unit such that said storing means provides information to said central control unit to control said rate of combustion.

53. The gas flame frying apparatus of claim 44 wherein said exhausting means includes an external heat recovery system for removal of residual heat energy.

54. The gas flame frying apparatus of claim 44 wherein said exhausting means includes a catalytic converter to remove toxic materials from said products of combustion.

55. The gas flame frying apparatus of claim 44 wherein at least a portion of said heat exchanger is disposed below said combustion chamber.

56. The gas flame frying apparatus of claim 44 wherein said frypot is a plastic material.

57. The gas flame frying apparatus of claim 44 wherein said frypot is a composite material.

58. The gas flame frying apparatus of claim 44 wherein said frypot is a ceramic material.

* * * * *

UNITED STATES PATENT AND TRADEMARK OFFICE
CERTIFICATE OF CORRECTION

PATENT NO. : 5,398,668
DATED : March 21, 1995
INVENTOR(S) : Manouchehr Daneshvar et al It is certified that error appears in the above-indentified patent and that said Letters Patent is hereby corrected as shown below:

Col. 2, line 64, "exchange" should be --exchanger--

Col. 3, line 17, "invention;" should be --invention.--

Col. 4, line 39, delete "to"

Col. 8, line 23, "exist" should be --exists--

Col. 8, line 60, "compress" should be --compressed--

Col. 9, line 22, delete "lo"

Col. 11, line 27, claim 16, "comprising;" should be --comprising:--

Signed and Sealed this

Sixteenth Day of April, 1996

BRUCE LEHMAN

*Attest:*

*Attesting Officer*  *Commissioner of Patents and Trademarks*